2 Sheets—Sheet 1.

W. T. DAUGHTREY.
Insect Exterminator.

No. 200,376. Patented Feb. 19, 1878.

Witnesses:
James Martin Jr
Jno. D. Patten

Inventor:
William T. Daughtrey
by
Mason, Fenwick & Lawrence

N. PETERS, PHOTO-LITHOGRAPHER, WASHINGTON, D. C.

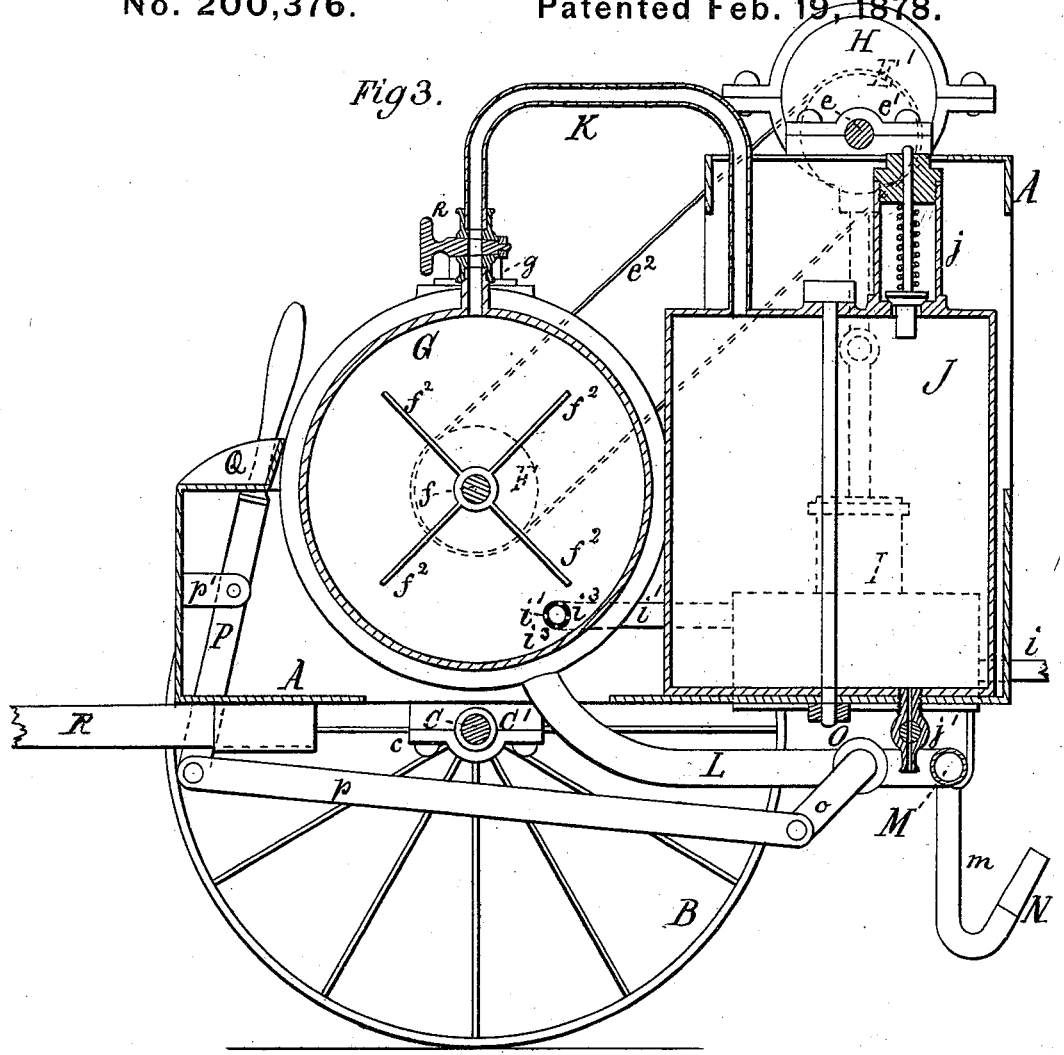
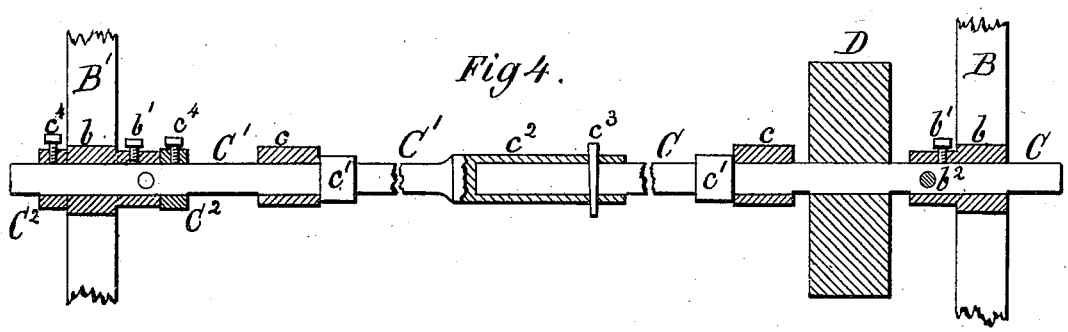

UNITED STATES PATENT OFFICE.

WILLIAM T. DAUGHTREY, OF SELMA, ALABAMA, ASSIGNOR OF ONE-HALF HIS RIGHT TO WM. W. McCOLLUM, OF SAME PLACE.

IMPROVEMENT IN INSECT-EXTERMINATORS.

Specification forming part of Letters Patent No. 200,376, dated February 19, 1878; application filed December 10, 1877.

*To all whom it may concern:*

Be it known that I, WILLIAM T. DAUGHTREY, of Selma, in the county of Dallas and State of Alabama, have invented certain new and useful Improvements in Insect-Destroyers, which improvements are fully set forth in the following specification and accompanying drawings, in which latter—

Figure 1:
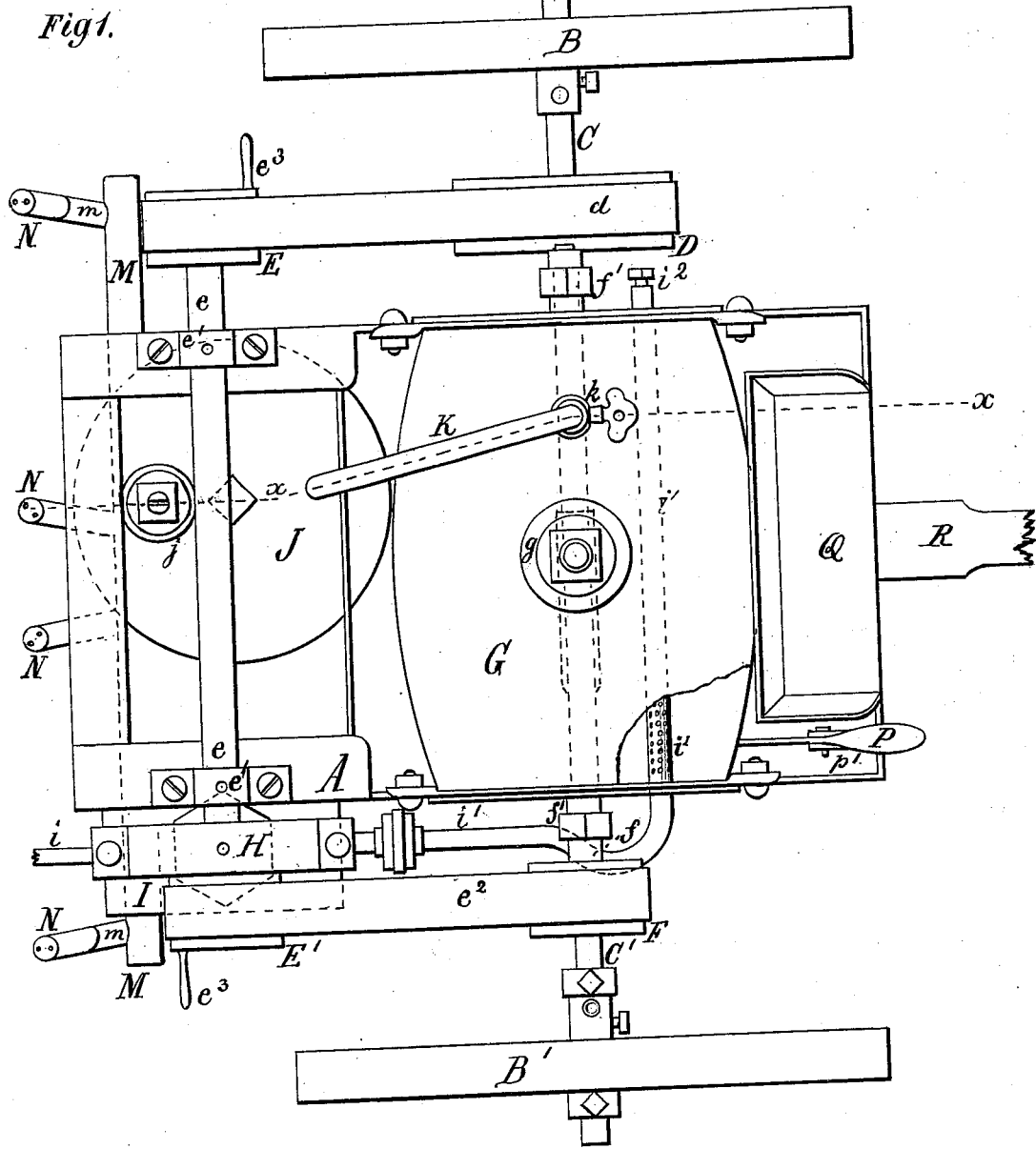
Figure 2:
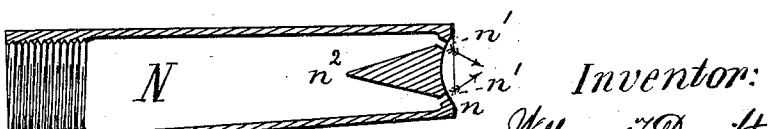

Figure 1 is a top view of my improved insect-exterminator. Fig. 2 is a detail view of one of the nozzles used thereon for distributing poisonous liquids upon the plants and insects. Fig. 3 is a vertical section in the line $x\,x$ of Fig. 1. Fig. 4 is a detail view of the axle-tree, showing the parts connected therewith in section.

The nature of my invention consists in certain constructions, combinations, and arrangements of parts, hereinafter fully described and specifically claimed, whereby a machine is produced by the aid of which poisonous liquid is sprinkled over plants infested with insects, such as cotton-worms, potato-bugs, Colorado beetles, grasshoppers, and the like, for the purpose of poisoning and destroying the same as they feed on the plants.

In the drawings, A represents the frame of a vehicle; B B′, the wheels, and C C¹ the two axles constituting the axle-tree, which have their bearings $c$ fastened below the frame A. Between the bearings $c$ the axles C C¹ are provided with shoulders $c^1$, whereby they are prevented from parting from each other longitudinally, while a socket, $c^2$, at the inner end of the axle C¹ incloses the inner end of the axle C, and thereby prevents both axles from moving out of line. The two said axles may be coupled by means of a pin, $c^3$, inserted into the socket $c^2$ and axle C; but usually it is omitted, and the axles C C¹ are allowed to revolve independently of each other. The hubs $b$ of the wheels B B′, are provided with set-screws $b^1$ or coupling-pins $b^2$, or with both, in order to fasten them to the axles C C¹. I prefer in common to allow the wheels B′ to run loosely on the axle C¹, and therefore dispense with the use of the set-screw $b^1$ and pin $b^2$, in which case I place on either side of the hub $b$ a collar, C², with a set-screw, $c^4$, to keep the wheel B′ from sliding longitudinally on its axle. The described application of the wheels B B′ to their axles serves to enable the operator to set them at any distance apart required, to suit the distance apart of the rows of any field to be operated upon.

The axle C is provided with a pulley, D, which, by means of a belt, $d$, drives a pulley, E, on one end of a shaft, $e$. The shaft $e$ runs in bearings $e^1$ fastened to the top of the frame A, and has a pulley, E′, at the other end, which, by means of a belt, $e^2$, drives a pulley, F, on a shaft, $f$. The shaft $f$ is secured in a central position to the ends of a barrel, G, by means of stuffing-boxes $f^1$, and inside the barrel G is provided with a number of agitator-arms, $f^2$, for the purpose of stirring the contents of the barrel. In some cases it may not be necessary to agitate the contents of the barrel, as described, and then the shaft $f$ with its agitator-arms may be omitted. The pulleys E and E′ are provided with crank-handles $e^3$, whereby the shaft $e$ may be turned by hand, as hereinafter fully explained. The shaft $e$ is also provided with an eccentric, H, which operates a pump, I, of ordinary construction. The supply-pipe $i$ of the pump I is adapted to have a hose attached to it when water is to be pumped. The discharge-pipe $i^1$ of the pump I passes through the barrel G near its bottom part, and is closed up at the end with a plug, $i^2$, which is removed when the pipe is to be cleaned.

Within the barrel G the pipe $i^1$ is provided with perforations $i^3$, through which either air or water, as the case may be, is forced by the pump I into the barrel G. The barrel G is provided with an opening in its top part, through which its charge is supplied, and which, during the operation of the machine, is closed with a screw-plug, $g$. The barrel G communicates with an air-vessel, J, by means of a pipe, K, which has a valve or cock, $k$, for the purpose of stopping such communication when desired.

The air-vessel J has a spring safety-valve, $j$, of common construction, which prevents the bursting of the barrel G and the vessel J by too great a pressure of air. A cock, $j'$, at the bottom of the vessel J serves to let off water accidentally deposited there.

From the bottom of the barrel G a pipe, L, conducts the charge of said barrel to a distributing-pipe, M, which is provided with a number of small pipes, $m$, having nozzles N. The pipe L is provided with a stop-cock, O, which has a lever-arm, $o$, whereby it is operated through a connecting-rod, $p$, and a hand-lever, P. The lever P has its fulcrum $p'$ on the frame A, and is placed near the seat Q on the front part of the frame, convenient to the operator thereon. The pipes $m$ are, by preference, made of flexible material, so that they may be arranged high or low, and with the nozzles pointing up or down. The nozzle N, as shown in section in Fig. 2, has a closed end, $n$, which is provided with two openings, $n^1$, oppositely inclined, as shown, so that the streams delivered through them meet at a point near the end $n$, and deflect and disperse one another, so as to form an extremely fine spray. Inside the nozzle the closed end $n$ has a central cone, $n^2$, which serves to concentrate the pressure of the liquid to the openings $n^1$, and also so separate the charge that matter more solid than water will be broken up, and thus offer no obstacle to its passage through the openings $n^1$.

The "charge" usually consists of water and some poisonous admixture used for killing worms and other insects. A pole or shaft, R, is suitably fastened to the frame A for the purpose of hitching a team thereto.

Operation: The barrel G is filled with water and poison through its upper opening, which is then closed up with the plug $g$, the stop-cock O being closed. Water may also, while the machine is stationary, be supplied by throwing the belts $d$ and $e^2$ off the pulleys E and E', and by turning the shaft $e$ by means of the crank-handles $e^3$, and thus operating the pump I, which is provided with a hose at $i$ for the purpose of lifting the water from a pond or well near by. The machine is then set in motion, so that its wheels travel between the rows of the field. As the wheel B revolves it moves the shaft C and pulley D around, and the latter, by means of the belt $d$ and pulley E, sets the shaft $e$ in motion. The eccentric H on the shaft $e$ thus operates the pump I, which forces air into the barrel G through the openings $i^3$ of the pipe $i^1$. In leaving the openings $i^3$ the air makes its way up through the water in the barrel, and produces a continuous and powerful agitation, whereby the water is thoroughly combined with its poisonous admixtures. The air is led from the barrel G through the pipe K into the air-vessel J, from which it exerts its pressure upon the surface of the water. When a sufficient pressure is obtained the stop-cock O is opened, whereby the water is forced into the pipes L, M, and $m$, and thence through the nozzles N. If the pressure of air within the barrel G and the air-vessel J becomes too great, the surplus is let off by the safety-valve J into the air. As the lower sides of the plant-leaves are generally infested by the vermin, the nozzles are so arranged as to force their fine sprays upward; but they may with little labor be set or arranged to deliver their sprays almost in any direction desirable. As the lower sides of leaves are more susceptible of retaining moisture, my method of forcing the poisonous spray upward will suit the majority of cases, as the purpose is to keep the poison in direct contact with the food of the vermin, and so insure the destruction of the latter. The pulley E moves the shaft $f$ and the agitator-arms $f^2$, whereby the agitation created by the air forced through the openings $i^3$ is increased in force and in the number of conflicting currents and eddies. When the supply of water is exhausted, the cock $k$ is closed and the plug $g$ is opened, in order to supply the barrel G with another charge of poisonous liquid. The plug $g$ is then closed again, and water pumped into the barrel G by hand, and in the manner already described. In moving the machine to and from its place of action, the belt $d$ is thrown off its pulleys, so that neither the pump I nor the agitator-shaft $f$ will work.

I am aware that sprinklers have been made and used for sprinkling plants; but in such case the shower of drops is too heavy to be retained by the plants, and consequently the greater part of the shower glides off the leaves and is deposited in the ground, which is thereby poisoned and rendered unfit for the growth of the plants, while the waste of labor and material can hardly be compensated by the benefit of such mode. Fine showers without artificial pressure have also been adopted; but by this mode the small drops have not enough power to penetrate the minute fur or other protective coverings or coatings of the under side of the leaves, and consequently accumulate and form drops too large to be sustained by the leaves, and so fall to the ground. Such fine showers have been created by means of fine orifices, which are easily obstructed, and deliver but a very small quantity of liquid. The openings $n^1$ in my improved nozzle N are larger in comparison with the aforesaid orifices, and deliver a great quantity of liquid, so that the machine may be moved at the usual gait of the team without failure of the necessary supply. The spray produced by the two inclined streams, meeting outside of the nozzle N, is at once copious, powerful, and extremely fine, the latter especially, because the small drops created by the concussion of the two streams spread in every direction, while in a small single orifice they propel one another in only one line and in close succession. The machine, used without poison, may also serve as an irrigator, street-sprinkler, or as a distributer of liquid fertilizers.

Having described my invention, what I claim as new, and desire to secure by Letters Patent, is—

1. In a machine for destroying worms and other insects which collect on plants, and for other purposes, the combination of a carriage, a force-pump, a fluid-tank, with or without an agitator, a compression-cylinder, and a distributing-pipe with discharging-nozzles, substantially as set forth.

2. In a machine for destroying worms and insects which collect on plants, and for other purposes, the combination of a sprinkling apparatus, having escape-passages, which distribute or deposit the poisonous liquids in streams or jets, which are forced toward and in contact with each other, and a force-pump for supplying the said apparatus with compressed air, substantially as set forth.

3. A pump, I, constructed to supply the tank G with fluid, and then to compress the fluid by forcing air into the tank and compression-cylinder J, in combination with a worm and insect destroying apparatus or other sprinkling apparatus, substantially as set forth.

4. The distributing-pipe M of the machine, with upwardly-curved or upwardly-inclined nozzles N, which discharge the fluid in an upward direction, longitudinally with the stalks of the plants, and beneath the branches and leaves thereof, substantially as set forth.

5. The combination of the lever P, located near the driver's seat, the connecting-rod $p$, the arm $o$, the stop-cock O, the pipes L, M, and $m$, and the nozzles, N, substantially as set forth.

6. The chamber J, having a safety-valve, $j$, a pipe, K, and cocks $k$ and $j'$, substantially as and for the purpose set forth.

7. The nozzle N, having the central cone $n^2$ and the inclined openings $n^1$, in combination with the distributing-pipe M of the tank G, substantially as and for the purpose set forth.

8. The agitator $f^2$, connected with and driven by the axle of the carriage, in combination with a water and air tight tank, G, for containing poisonous liquids, whereby liquids impregnated with poisonous substances for destroying insects are kept in proper condition for being discharged during the operation of the machine, substantially as set forth.

9. The force-pump communicating with the tank and cylinder, and connected with and driven by the axle of the carriage, substantially as described.

10. The pipe $i^1$, perforated within the tank or barrel G, in combination with the force-pump I, substantially in the manner and for the purpose described.

WILLIAM TRIPLETT DAUGHTREY.

Witnesses:
N. H. N. DAWSON,
J. N. MONTGOMERY.